(12) United States Patent
Lin

(10) Patent No.: US 6,497,144 B1
(45) Date of Patent: Dec. 24, 2002

(54) METHOD FOR MEASURING FLUID LEVEL

(75) Inventor: Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/628,889

(22) Filed: Jul. 31, 2000

(51) Int. Cl.[7] .............................................. G01F 23/00
(52) U.S. Cl. .................................. 73/304 C; 73/290 R
(58) Field of Search .......................... 73/290 R, 304 C; 702/55

(56) References Cited

U.S. PATENT DOCUMENTS

| | | | | |
|---|---|---|---|---|
| 4,204,427 A | * | 5/1980 | Gothe et al. | 73/304 C |
| 4,383,444 A | * | 5/1983 | Beaman et al. | 73/304 C |
| 4,547,725 A | * | 10/1985 | Oetiker et al. | 324/61 R |
| 4,924,702 A | * | 5/1990 | Park | 73/304 C |
| 5,103,368 A | * | 4/1992 | Hart | 361/284 |
| 5,477,727 A | * | 12/1995 | Koga | 73/304 C |

* cited by examiner

Primary Examiner—Daniel S. Larkin
Assistant Examiner—Katina Wilson
(74) Attorney, Agent, or Firm—Margaret A. Dobrowitsky

(57) ABSTRACT

A method for measuring fluid level uses data sensed by an oil level sensor to determine the level of oil in a motor vehicle oil pan. The oil level sensor can include a receiver tube oriented upright in the oil pan of the vehicle. A level tube is disposed in the receiver tube and below the level tube is a reference tube. A circuit is electrically connected to the tubes for outputting a signal representative of oil level in the oil pan. As the engine oil level decreases within the level tube, the output of the sensor drops. The method includes providing a series of signals to the sensor and recording the output from the sensor with the sensor in a variety of configurations. This information is then processed to determine the ratio of measured oil in the oil pan to the proper operating oil level.

4 Claims, 2 Drawing Sheets

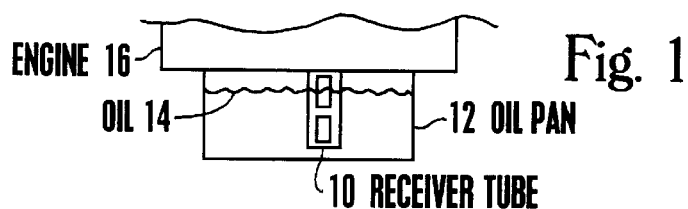
Fig. 1
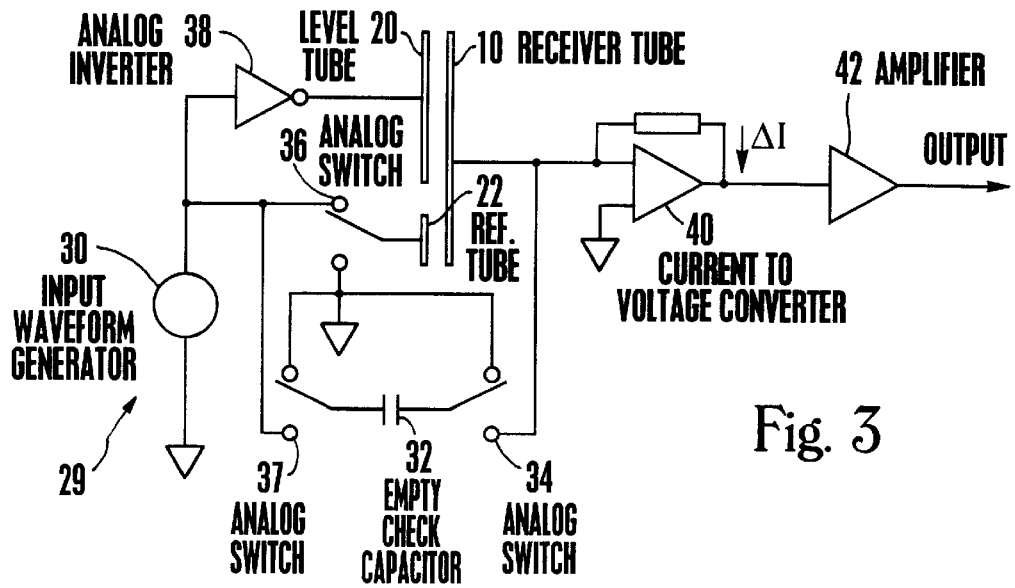
Fig. 3
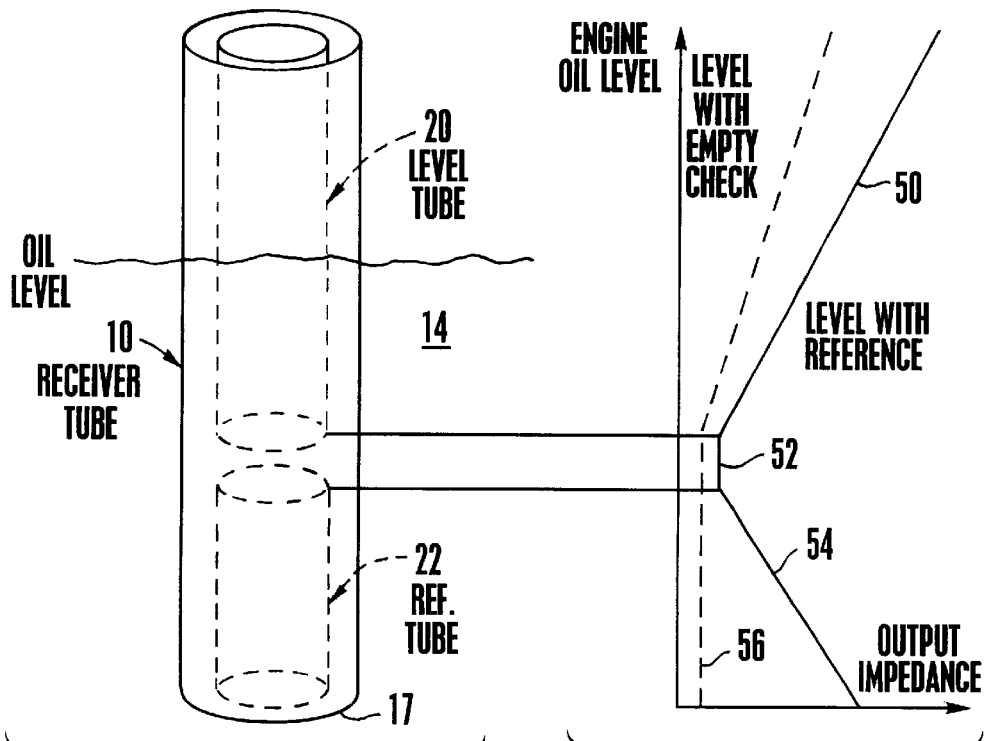
Fig. 2
Fig. 4

METHOD FOR MEASURING FLUID LEVEL

TECHNICAL FIELD

The present invention relates generally to systems and methods for measuring fluid levels, and more particularly to methods and structure for measuring oil level in a vehicle engine.

BACKGROUND OF THE INVENTION

Accurately measuring fluid levels is important in many applications. As but one example, automatically monitoring the quality and amount of oil in a vehicle alerts drivers in a timely fashion when maintenance should be performed as dictated by the actual condition of the vehicle. Performing maintenance when it is actually required is preferred over following a predetermined, one-size-fits-all schedule that might be too long or too short for any given vehicle, depending on the way the vehicle is driven. If too long a period elapses between maintenance, a vehicle can be damaged. On the other hand, conducting maintenance when it is not needed is wasteful both in terms of labor and in terms of natural resources. For example, if a vehicle doesn't require an oil change but nevertheless receives one, oil is in effect wasted.

Accordingly, systems have been provided for measuring various parameters of a vehicle's engine oil, and to generate warning signals when maintenance is due as indicated by the condition of the oil. Among the parameters that are typically measured are oil temperature, condition, and level, and the signals from multiple sensors can be combined to generate the final engine oil maintenance signal. Of importance to the present invention is the accurate measurement of oil level.

As understood herein, oil level depends on many factors. Electrical properties of oil are used to measure level, which has the advantage of providing very accurate measurements. We have recognized, however, that the electrical properties depend on, among other things, temperature, oil brand, oil condition, and oil contamination, making it difficult to accurately measure oil level over a wide temperature range and independently of brand and condition.

The present invention understands that a reference sensor can be used along with a level sensor. The signal from the level sensor is divided by the signal from the reference sensor to cancel the effects of oil condition and so on, leaving a signal that represents level only. As recognized herein, two different oil levels may have the same output. In order to distinguish the two different oil levels, a fixed and known value capacitor, referred to herein as an on chip capacitor, is needed. If untrimmed, the on chip capacitor may have a twenty percent (plus or minus) variation around the nominal value. This variation is unacceptable for the required accuracy for oil level, which typically is plus or minus ten percent. The on chip capacitor may be trimmed to increase its accuracy. However, trimming the on chip capacitor increases the cost of the oil sensor.

Existing sensors also have very small signal strengths, and, hence, poor signal-to-noise ratios. Significant amplification of the output signal is required, and this in turn introduces noise amplification and the problems attendant thereto. Moreover, to eliminate temperature differential effects the two sensors should be positioned close together. However, placing the sensors close together normally dictates using a relatively low input signal frequency that might not be effective at low oil temperatures. The present invention has recognized these prior art drawbacks, and has provided the below-disclosed solutions to one or more of the prior art deficiencies. More specifically, the present invention can accurately determine the oil level by precalibration of the sensor without trimming the on-chip capacitor, and thus without increasing the cost of the sensor.

SUMMARY OF THE INVENTION

A method for measuring fluid level in a motor vehicle includes providing a fluid level sensor that includes a receiver tube positionable in a container of fluid such that it defines an upright orientation when it is installed in the container. The fluid level sensor also includes a level tube that is coaxially disposed in the receiver tube, a reference tube that is coaxially disposed in the receiver tube below the level tube relative to the upright orientation and a circuit that is electrically connected to the tubes for outputting a signal representative of fluid level in the container.

The method includes determining and recording a sensor output, $V_{L/Eair}$, with the circuit in the level/empty configuration and the sensor in air, and then determining and recording a sensor output, $V_{L/Rair}$, with the circuit in the level/reference configuration and the sensor in air. The next step is to determine and record a sensor output, $V_{L/Etest}$, with the circuit in the level/empty configuration and the sensor in a test fluid, and then determining and recording a sensor output, $V_{L/Rtest}$, with the circuit in the level/reference configuration and the sensor in a test fluid.

Following the above steps, the sensor is placed in a subject fluid, such as oil, and a sensor output, $V_{L/Eoil}$, with the circuit in the level/empty configuration, is determined and recorded. With the sensor remaining in the subject fluid and the circuit in the level/reference configuration, a sensor output, $V_{L/Roil}$, is then determined and recorded. Based on the above sensor outputs, the level of subject fluid in a container is determined.

In a presently preferred embodiment of the invention discussed below, a triangular waveform is input to the circuit. Moreover, a signal is provided to a gauge that continuously displays the subject fluid level. Alternatively, a signal is provided to a warning light that is illuminated when the subject fluid level falls below a predetermined level.

In another aspect of the present invention, a method for determining fluid level uses a fluid level sensor that includes a container, a receiver tube oriented upright in the container, a level tube in the receiver tube, a reference tube in the receiver tube, and a circuit electrically connected to the tubes for outputting a signal representative of fluid level in the container. The first step in this aspect of the present invention is to place the sensor in a fluid. Next, the sensor is configured to a level/empty configuration, and a signal is input to the circuit. A first sensor output is received. The sensor is then configured to a level/reference configuration, a signal is input to the circuit, and a second sensor output is received. Based on the first and second outputs, a signal representative of fluid level in the container is then output.

The present invention will now be described, by way of example, with reference to the accompanying drawings, in which:

BRIEF DESCRIPTION OF THE DRAWINGS

FIG. 1 is a schematic view of the present receiver tube mounted in the engine oil pan;

FIG. 2 is a schematic plan view of the level tube and reference tube disposed in the receiver tube;

FIG. 3 is a schematic diagram of the ideal electrical circuit used to sense impedance ratios;

FIG. 4 is a graph which represents the output of the electrical circuit shown in FIG. 3 when connected to the receiver tube shown in FIG. 1;

DESCRIPTION OF AN EMBODIMENT OF THE INVENTION

Figure 5:
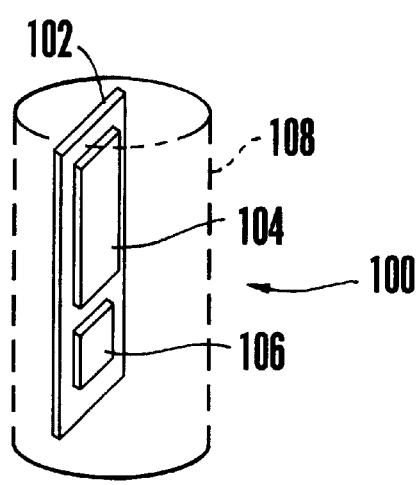
FIG. 5 is a schematic diagram of an alternate embodiment.

Referring initially to FIG. 1, a receiver tube 10 is shown mounted in an upright position in an oil pan 12. Liquid such as oil 14 of the engine 16 enters into the interior of the receiver tube 10 by any means, such as, e.g., through the open bottom end 17 of the receiver tube 10 or a hole (not shown) that is formed near the bottom end 17 of the tube 10. It is to be understood that the present invention can be used in a wide range of other applications that require measuring fluid level.

Now referring to FIG. 2, the receiver tube 10 is a hollow cylindrical tube fabricated out of conductive material. Level tube 20 and a reference tube 22, both fabricated from conductive material, are disposed in the receiver tube 10 coaxially with each other and with the receiver tube 10 coaxially with each other and with the receiver tube 10. As shown, the reference tube 22 is coaxially disposed in the receiver tube 10 below the level tube 20 relative to the upright position.

In accordance with the present invention, the level tube 20 and the receiver tube 10 together establish a first impedance value and the reference tube 22 and the receiver tube 10 together establish a second impedance value. The impedance can be modeled as a capacitor in parallel with a resistor. The impedances depend on the geometry of the tubes, the relative position of the tubes, and the physical properties of intermedium materials filled between the tubes. In one preferred embodiment, the intermedium material is oil; however the present invention is not limited to oil, but could use any appropriate liquid. As the skilled artisan will appreciate, the impedance is further dependent on the dielectric coefficient and conductivity of the liquid.

Referring now to FIG. 3, an electrical circuit generally designated 29, is shown that includes an input signal generator 30. In a preferred embodiment, the input signal generator 30 generates a triangle wave, although other waveforms can be used. In a first configuration of the circuit 29, the level tube 20 is in electrical combination with reference tube 22, and in a second configuration of the circuit 29, the level tube 20 is in electrical combination with an empty check capacitor 32. Analog switches 34, 36, and 37 are used to select the level tube 20 with empty check capacitor 32 configuration and level tube 20 with reference tube 22 configuration, respectively. As disclosed further below, the reason for using the empty check capacitor 32 is to distinguish two possible liquid levels with the same output, with the reference tube 22 being used to compensate for variations in liquid physical properties.

Continuing the description of FIG. 3, in either configuration, the signal generator 30 is connected to an analog inverter 38 which inverts the polarity of the waveform signal with respect to the parallel path established by the setting of the analog switches 34 and 37. To select the empty check capacitor 32 (i.e., second) configuration, the analog switches 34 and 37 are configured to complete the circuit from the input signal generator 30 through the empty check capacitor to the input of a first amplifier circuit 40. In this configuration, the analog switch 36 connects the reference tube 22 to ground, and each path of the above-described parallel circuit establishes a signal level and a phase shift of the input signal generator waveform. These signal levels and phase shifts are summed together at the input of the first amplifier circuit 40. The output of the first amplifier circuit 40 is interconnected to a second amplifier circuit 42, which provides the final output of the circuit 29.

To select the first configuration (i.e., level tube 22 with receiver tube 10), the analog switch 36 is configured to complete the path from the input signal generator 30 through the reference tube 22-receiver tube 10 to the input of the first amplifier circuit 40. On the other hand, the analog switches 34 and 37 are configured to interconnect the empty check capacitor 32 to ground. In this first configuration, each path of the parallel circuit establishes a signal level and a phase shift of the input signal generator waveform, with the signal levels and phase shifts being summed together at the input of the first amplifier circuit. The relationships between the input triangle waveform, receiver tube impedance, system parameters, and the electrical circuit output are shown in equations below:

$$V_{OUT} = \alpha A \Delta I$$

$$V_{L/E} = \alpha A[(dV_{IN}/dt)(C_L - C_E) + (V_{IN}/R_L)]$$

$$V_{L/R} = \alpha A[(dV_{IN}/dt)(C_L - C_R) + (V_{IN}/R_L) - (V_{IN}/R_R)]$$

Where:
$\Delta I$=The current through the feedback impedance (A)
$\alpha$=Coefficient of current to voltage converter (V/A)
A=gain of voltage amplifier (V/V)
$V_{IN}$=Input Voltage
$V_{L/E}$=Sensor output with level/empty configuration (V)
$V_{L/R}$=Sensor output with level/reference configuration (V)
$C_L$=Level sensing element capacitance (F)
$C_R$=Reference sensing element capacitance (F)
$C_E$=Empty check capacitance (F)
$R_L$=Level sensing element resistance (W)
$R_R$=Reference sensing element resistance (W)

FIG. 4 illustrates the output level from the circuit 29. This graph represents the difference of the impedance change of the system as oil level varies. As shown, the output 50 of the circuit 29 is at the highest value when the level tube 20 is completely full of engine oil 14. As the engine oil 14 level decreases within the level tube 20, the output of the sensor drops. When the engine oil 14 level is below the bottom of the level tube 20 but higher than the top of the reference tube 22, the output 50 reaches the lowest value, as shown at 52. As the engine oil 14 level continues decreasing (below the top of the reference tube 22), the output of the circuit 29 will increase for the first circuit 29 configuration (i.e., level with reference tube 22) as shown at 54, and will stay constant for the second configuration level as shown at 56.

FIG. 5 shows an alternate sensor 100 wherein the receiver tube 10, level tube 20, and reference tube 22 have been respectively replaced by a receive plate 102, upper plate 104, and lower plate 106. The plates 104, 106 are closely spaced from the receive plate 102 and are vertically aligned with each other within a holder 108.

Figure 6:
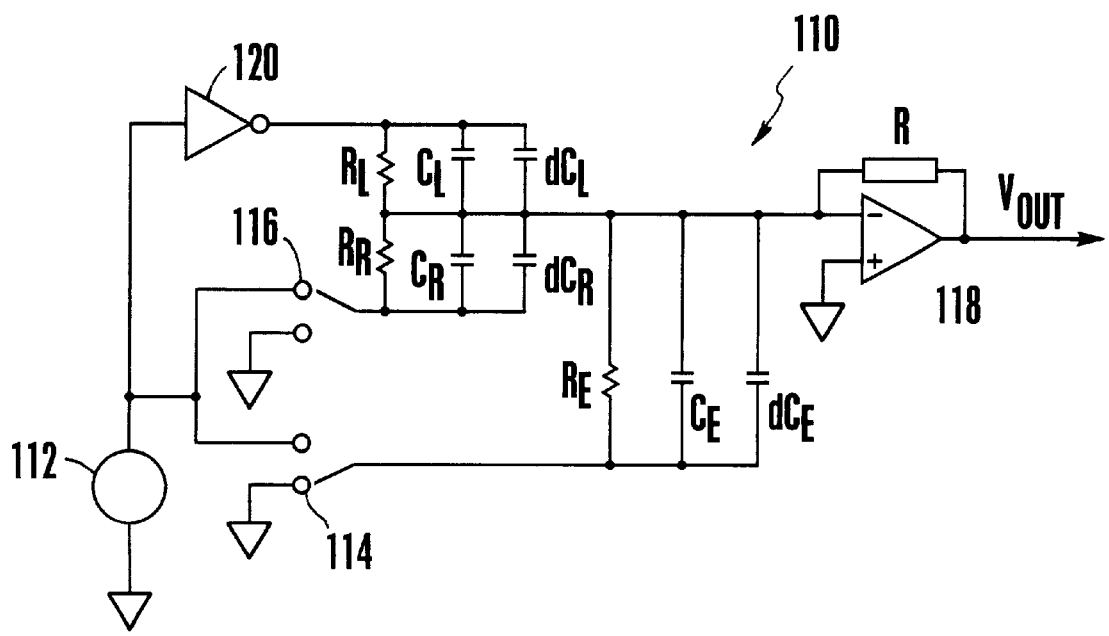
FIG. 6 is a schematic diagram of the general electrical circuit used to sense impedance ratios.

Referring now to FIG. 6, an electrical diagram showing a more generalized circuit, generally designated 110, is shown that includes a first voltage source 112 and a second voltage source 114. In a preferred embodiment the first voltage source 112 provides a triangular voltage and the second voltage source 114 provides an inverted triangular voltage, although other waveforms can be used. In a first configuration of the circuit 110, an oil level tube capacitor $C_L$ is arranged in parallel with an additional oil level tube capacitor $dC_L$ and an oil level tube resistor $R_L$. These three components are in series with three other co-parallel components, namely an oil condition (reference) tube capacitor $C_R$, an additional oil condition (reference) tube capacitor $dC_R$, and an oil condition (reference) tube resistor $R_R$. In a second configuration of the circuit 110, the oil level tube capacitors $C_L$ and $dC_L$ and the level tube resistor $R_L$ are in electrical series with an empty check capacitor $C_E$, an additional empty check capacitor $dC_E$, and an empty check resistor $R_E$. Analog switches 114 and 116 are used to select the first configuration and the second configuration, respectively.

Continuing the description of FIG. 6, in order to select the second configuration, i.e., the level/empty configuration, the analog switch 116 is configured to complete the circuit from the input signal generator 112 through the empty check capacitors $C_E$ and $dC_E$ and the empty check resistor $R_E$ and the input of an amplifier circuit 118 which provides the final output of the circuit 110. In this configuration, the analog switch 114 connects the reference tube capacitors $C_R$ and $dC_R$ and the reference tube resistor $R_R$ to ground, and each path of the of the above-described circuit establishes a signal level and a phase shift of the input signal generator waveform. These signal levels and phase shifts are summed together at the input of the amplifier circuit 118. FIG. 6 also shows an analog inverter 120 installed in the circuit between the input signal generator 112 and the level tube/reference tube configuration.

To select the first configuration, i.e., the level/reference configuration, the second analog switch 116 is configured to complete the path from the input signal generator 112 through the analog inverter 120 to the level tube capacitors $C_L$ and $dC_L$ and resistor $R_L$, and the input signal generator 112 through the reference tube capacitors $C_R$ and $dC_R$ and resistor $R_R$. On the other hand, the first analog switch 114 is configured to interconnect the empty check capacitors $C_E$ and $dC_E$ and empty check resistor $R_E$ to ground. In this first configuration, each path of the circuit establishes a signal level and a phase shift of the input signal generator waveform, with the signal levels and phase shifts being summed together at the input of the amplifier circuit 118.

The receiver tube 10, level tube 20, and reference tube 22 may be employed in the method set forth below to determine the oil level in the vehicle by using the equation below with reference made to the circuit shown in FIG. 6:

$$\beta = \frac{(V_{L/Eoil} - V_{L/Eair})(V_{L/Rair} + V_{L/Etest} - V_{L/Eair} - V_{L/Rtest})}{(V_{L/Etest} - V_{L/Eair})(V_{L/Rair} + V_{L/Eoil} - V_{L/Eair} - V_{L/Roil})}$$

Where:

$\beta$ = Ratio of measured oil to the full oil level $V_{L/Eair}$ = Sensor output with level/empty configuration in air (V)

$V_{L/Rair}$ = Sensor output with level/reference configuration in air (V)

$V_{L/Etest}$ = Sensor output with level/empty configuration in test fluid (V)

$V_{L/Rtest}$ = Sensor output with level/reference configuration in test fluid (V)

$V_{L/Eoil}$ = Sensor output with level/empty configuration in oil (V)

$V_{L/Roil}$ = Sensor output with level/reference configuration in oil (V)

In order to determine the level of the motor oil 14 in the oil pan, based on the equations given above with reference to FIG. 6, the sensor is first calibrated. The sensor is calibrated by first placing the sensor in air and establishing the level/empty configuration. An input signal is then provided to the sensor and the sensor output, $V_{L/Eair}$, is then received by the processor 154 and recorded. The level/reference configuration is then established and another signal is input to the sensor. The sensor output, $V_{L/Rair}$, is received and recorded by the processor 154.

The second step of calibrating the sensor is to place the sensor in a test fluid and the above steps are repeated, i.e., the level/empty configuration is established and a signal is input to the sensor. The sensor output, $V_{L/Etest}$, is received and recorded by the processor 154. The level/reference configuration is then established and, again, a signal is input to the sensor. The sensor output, $V_{L/Rtest}$, is then received and recorded by the processor 154. The above-mentioned four records, $V_{L/Eair}$, $V_{L/Rair}$, $V_{L/Etest}$, and $V_{L/Rtest}$, are the calibration data of the sensor. It is to be appreciated that in lieu of placing the sensor in air to complete the first sensor calibration step, the sensor may be placed in a different test fluid, i.e., a test fluid having different electrical properties than the test fluid in which the sensor is placed during the second calibration step.

After the sensor is calibrated following the above steps, the level of the oil 14 in the oil pan 12 may then be determined by first positioning the sensor within the oil pan. Once the sensor is properly in place, the circuit 110 is configured to the level/empty configuration and a signal is input to the sensor. The sensor output, $V_{L/Eoil}$, is then received and recorded by the processor 154. The circuit 110 is then configured to the level/reference configuration and, again, a signal is input to the sensor. The sensor output, $V_{L/Roil}$, is then received and recorded by the processor.

The calibration sensor outputs, $V_{L/Eair}$, $V_{L/Rair}$, $V_{L/Etest}$ and $V_{L/Rtest}$, and the oil level measurement outputs, $V_{L/Eoil}$ and $V_{L/Roil}$, are then input into the formula for b, given above, to determine the oil level in the oil pan.

Figure 7:
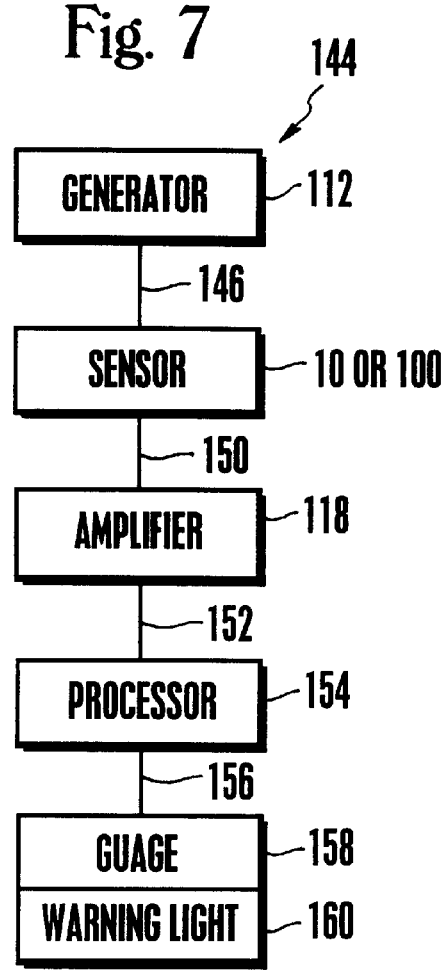
FIG. 7 is a block diagram of the oil sensing system.

Referring now to FIG. 7, a block diagram representing the present system utilized by the present method is shown and generally designated 144. The waveform generator 112 provides a preferably triangular signal 146 to a sensor, such as sensor 10 or 100, and a transformed signal 150 output by the sensor is input into the amplifier 118. Accordingly, an amplified signal 152 from the amplifier 118 is then recorded and/or processed by a processor 154 in order to determine the fluid level in the vehicle in accordance with the method above. The processor 154 can then provide a processed signal 156 to a gauge 158 that shows the fluid level continuously or to a warning light 160 that is illuminated when a critical fluid level is reached.

While the particular METHOD FOR MEASURING FLUID LEVEL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for".

What is claimed is:

1. A method for measuring fluid level in a motor vehicle comprising the acts of:

providing a fluid level sensor comprising:

a receiver tube positionable in a container of fluid, the receiver tube defining an upright orientation when installed in the container;

a level tube coaxially disposed in the receiver tube;

a reference tube coaxially disposed in the receiver tube below the level tube relative to the upright orientation; and a circuit electrically connected to the tubes for outputting a signal representative of fluid level in the container;

determining and recording a sensor output, $V_{L/Eair}$, with the circuit in the level/empty configuration and the sensor in air;

determining and recording a sensor output, $V_{L/Rair}$, with the circuit in the level/reference configuration and the sensor in air;

determining and recording a sensor output, $V_{L/Etest}$, with the circuit in the level/empty configuration and the sensor in a test fluid;

determining and recording a sensor output, $V_{L/Rtest}$, with the circuit in the level/reference configuration and the sensor in test fluid;

determining and recording a sensor output, $V_{L/Eoil}$, with the circuit in the level/empty configuration and the sensor in subject fluid;

determining and recording a sensor output, $V_{L/Roil}$, with the circuit in the level/reference configuration and the sensor in subject fluid; and based on the sensor outputs, determining the level of subject fluid in a container.

2. The method of claim 1, further comprising the act of: inputting to the circuit a triangular waveform.

3. The method of claim 1, further comprising the act of: providing a signal to a gauge that continuously displays the subject fluid level.

4. The method of claim 1, further comprising the act of: providing a signal to a warning light that is illuminated when the subject fluid level falls below a predetermined level.

* * * * *